United States Patent [19]

Kranz

[11] Patent Number: 4,552,271
[45] Date of Patent: Nov. 12, 1985

[54] COLLAPSIBLE CONTAINER CONSTRUCTION

[76] Inventor: Kermit W. Kranz, 8160 W. Kochville Rd., Saginaw, Mich. 48603

[21] Appl. No.: 593,897

[22] Filed: Mar. 27, 1984

[51] Int. Cl.⁴ .............................................. A47F 5/11
[52] U.S. Cl. ......................................... 211/41; 108/27; 108/99; 211/72; 211/149; 294/161; 294/162
[58] Field of Search ...................... 211/71, 72, 73, 135, 211/132, 41, 149; 294/161, 162; 108/27, 34, 35, 99, 100

[56] References Cited

U.S. PATENT DOCUMENTS

| 1,443,207 | 1/1923 | Blount | 211/71 X |
|---|---|---|---|
| 1,583,295 | 5/1926 | Larsen | 211/71 X |
| 1,602,410 | 10/1926 | Hamblin | 211/149 X |
| 3,375,934 | 4/1968 | Bates | 211/72 |
| 4,123,128 | 10/1978 | Abele | 211/71 X |
| 4,269,461 | 5/1981 | Roach | 294/161 X |

Primary Examiner—Robert W. Gibson, Jr.
Attorney, Agent, or Firm—Learman & McCulloch

[57] ABSTRACT

A support for tostadas comprises a framework having spaced, parallel, upright frame members spanned by vertically spaced shelves joined at corresponding ends to the frame members. The shelves have free edges provided with retainer flaps having footed portions at their opposite ends which are of such length as to bear against the lower shelf and form a barrier to a tostada's sliding off such lower shelf.

10 Claims, 5 Drawing Figures

COLLAPSIBLE CONTAINER CONSTRUCTION

This invention relates to a collapsible container that is especially adapted for use in supporting food products such as tostadas, during transport.

BACKGROUND OF THE INVENTION

Most Mexican food restaurants offer a carry-out service wherein food products such as tacos, tamales, tostadas, and the like are picked up by a customer for transport to a location remote from the restaurant for consumption. Many of the food products present no particular transportation problems. Some products, such as tacos and tostadas, do present transportation problems inasmuch as each such product includes a plurality of loose ingredients which can become dissasociated unless considerable care is taken to maintain the product in an upright condition. Racks exist for transporting a V-shaped taco, but, so far as is known, no rack or other container construction has been proposed for transporting tostadas or other food products of the kind wherein loose ingredients are mounded on a flat tortilla.

The principal object of the present invention, therefore, is to provide a support or rack for transporting tostada-like food products in such manner as to maintain them in a stable, upright condition.

SUMMARY OF THE INVENTION

A container constructed in accordance with the invention includes a pair of spaced frame members spanned by a plurality of spaced shelves each of which is adapted to support a tostada or other food product of the kind having loose ingredients mounded on a flat base. Each shelf which overlies a lower shelf includes retainer flaps at the free edges thereof and which have footed portions which span the distance between the adjacent shelves. Each such retainer may be hinged so as to be movable from a position in face-to-face engagement with its supporting shelf, thereby enabling a food product to be inserted between adjacent shelves, to a depending position in which the aforementioned footed portions bear against the adjacent lower shelf. The retainers thereby provide barriers which prevent a food product from sliding off its supporting shelf.

The uppermost shelf, as well as any other shelf, may be provided with tabs adjacent its free ends and which may be bent upwardly out of the plane of the shelf so as to provide a stop to prevent sliding of a food product off the uppermost shelf.

Preferably, the shelves are hingedly connected to the frame members, thereby enabling the support to be collapsed when not in use. The support thus occupies a minimum amount of space during storage or shipment.

DESCRIPTION OF THE DRAWINGS

The foregoing and other advantages of the invention are disclosed in the following description and the accompanying drawings, wherein.

DETAILED DESCRIPTION

Figure 1:
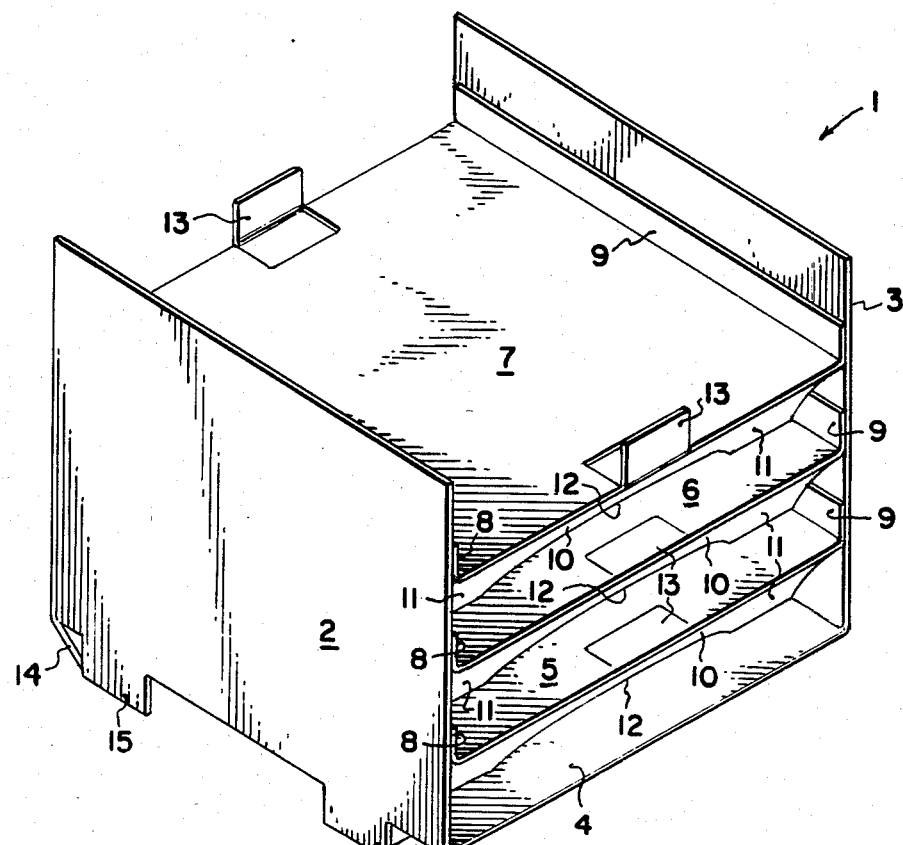
FIG. 1 is an isometric view illustrating a support constructed in accordance with the invention and in a position to receive and support four tostadas or similar food products.

The preferred embodiment of the invention comprises a framework designated generally by the character 1 having a pair of frame members 2 and 3 formed of stiff paperboard, plastic, or other suitable material. Spanning the distance between the frame members 2 and 3 is a plurality of shelf-like members 4, 5, 6, and 7. Each of the shelves 5–7 has flaps 8 and 9 at its opposite ends and which may be bent to parallel the associated frame members 2,3 and be secured thereto by a suitable adhesive. The lowermost shelf 4 may be provided with similar flaps, if desired, but it is preferred that the shelf 4 constitute an integral part of the frame 1. This may be accomplished by forming the members 2, 3, and 4 from a single blank of material.

Those edges of the shelves 4–7 which are not joined to the respective frame members 2 and 3 hereinafter will be referred to as the free edges. At the free edge of each shelf which overlies another shelf, i.e., each of the shelves 5, 6, and 7, is a downwardly turned retainer flap 10 which preferably constitutes an integral part of the associated shelf. The juncture between each flap 10 and its associated shelf forms a hinge which enables each flap to swing to a position in which it underlies and engages the shelf to which it is joined.

Adjacent each end of each retainer flap 10 is a footed portion 11 which is of greater length than the spacing between the adjacent shelf. Thus, each foot 11 bears on the upper surface of the adjacent lower shelf and at a position inwardly from the free edge of the latter. See FIG. 2. Each retainer flap 10 is provided with an arcuate lower edge forming a downwardly concave web 12 for a purpose presently to be explained.

Figure 3:
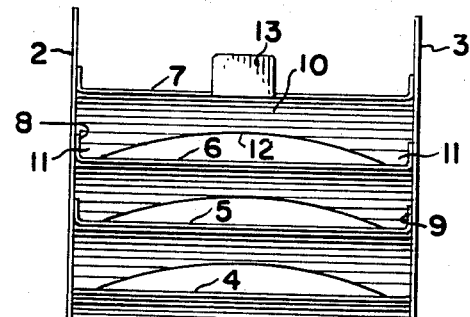
FIG. 3 is an end elevational view.
Figure 4:
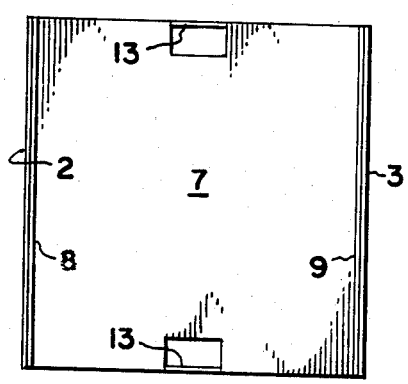
FIG. 4 is a top plan view.

The uppermost shelf 7 is secured to the frame members 2 and 3 short of the adjacent ends thereof. The shelf 7 is provided with a pair of tabs 13 located one adjacent each free edge of the shelf 7. Each tab is formed by die cutting the shelf 7 and is swingable out of the plane of the shelf to an upright position as is best shown in FIGS. 1 and 3. Although it is not necessary to provide the other shelves 4–6 with tabs 13, they may be included if desired.

The lowermost shelf 4 preferably has a downwardly extending flap 14 at each of the free edges of the shelf. Such flaps are not essential, but provide reinforcement for the lower shelf.

Figure 2:
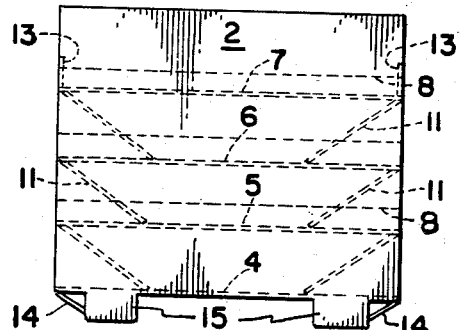
FIG. 2 is a side elevational view, on a reduced scale.

The lower shelf 4 also preferably includes a pair of die cut tabs 15 adjacent each of the frame members 2 and 3. The tabs 15 may be bent downwardly as is best shown in FIGS. 1 and 2 to provide spacing between the lowermost shelf 4 and a tabletop or counter on which the frame 1 may be positioned.

Figure 5:
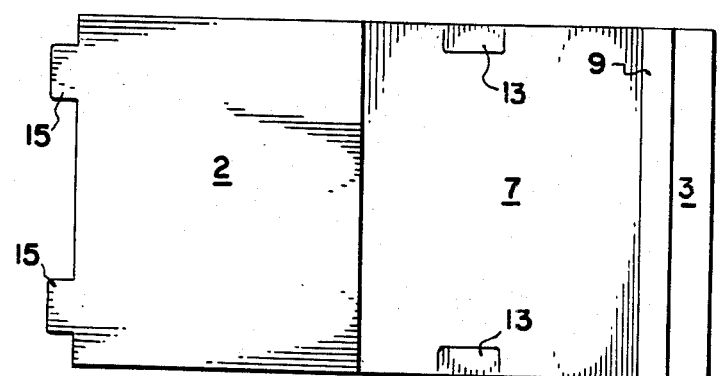
FIG. 5 is a plan view illustrating the support in collapsed condition.

The support frame 1 is maintained in a collapsed condition until such time as it is to be used. The collapsed condition is illustrated in FIG. 5 wherein the frame members 2 and 3 lie closely adjacent one another with the shelves 4–7 therebetween and nested with each other.

When it is desired to transport a tostada or the like, the frame 1 may be erected and a tostada positioned for insertion between the shelves 4 and 5, for example. To insert the tostada the retainer flap 10 is upwardly swung and held in face-to-face engagement with the lower surface of the adjacent upper shelf 5 while the tostada is slid transversely across the shelf 4. Once the tostada is centrally located on the shelf 4, the retainer 10 may be released, whereupon it will return to its lowered position. Since tostadas conventionally comprise a flat tortilla on which loose ingredients are mounded, the concave web 12 of the retainer flap 10 prevents the retainer from bearing directly against the loose ingredients.

Additional tostadas may be supported on each of the shelves 5-7. The tostada on the uppermost shelf 7 may be retained on the latter by bending the tabs 13 upwardly.

The stiffness of the material from which the frame members and the shelves are formed should be sufficient to prevent collapse of the frame when it is used for the support of the food items.

It is contemplated that each frame 1 will be manufactured to such dimensions that the spacing between the frame members 2 and 3, when the frame is erected, corresponds substantially to the diameter of the tortilla and the spacing between adjacent shelves is somewhat greater than the maximum height of a tostada. The footed portions 11 of the retainer flaps 10 are so located that each will be in a position to engage an edge of the tortilla which is inward of the free edge of the associated shelf. Since the length of each footed portion 11 is greater than the distance between the adjacent shelves, any tendency on the part of a tostada to slide toward the free edge of a shelf will be resisted by the footed portions 11.

To remove a tostada from one of the lower shelves 4-6, it is only necessary to swing the associated flap 10 upwardly, thereby enabling the tostada to be slid off the shelf. The concave configuration of the web 12 of the retainer flap prevents the loose ingredients from being pushed off the tortilla by the flaps.

This disclosure is representative of a presently preferred embodiment of the invention, but is intended to be illustrative rather than definitive thereof. The invention is defined in the claims.

I claim:

1. A container for supporting a plurality of similar items comprising a pair of spaced apart, parallel frame members; a plurality of shelf members secured to and spanning the space between said frame members, said shelf members being spaced from one another a distance sufficient to enable one of said items to be accommodated between adjacent shelf members; and retaining means carried by each shelf member which overlies another shelf member and having at least one footed portion of such length as at least to span the space between adjacent shelf members, each of said retaining means being hinged to the associated shelf member for swinging movements between a first position in which the space between the associated shelf member and the adjacent shelf is clear and a second position in which said retaining means forms a barrier between the associated shelf member and the adjacent shelf member.

2. A container according to claim 1 wherein the length of said portion of each of said retaining means is greater than the spacing between adjacent shelf members.

3. A container according to claim 1 wherein each of said overlying shelf members is provided with a pair of said retaining means, one of which is at one end of such shelf member and the other of which is at the opposite end of such shelf member.

4. A container according to claim 1 wherein each of said retaining means is provided with two of said footed portions located one adjacent each of said frame members, each of said two footed portions being joined by a concave web.

5. A container according to claim 1 wherein each of said shelf members is hingedly secured to said frame members, thereby enabling said container to be collapsed.

6. A container according to claim 5 wherein said retaining means are sufficiently rigid when spanning the distance between adjacent shelf members to prevent collapse of said support.

7. A container according to claim 1 wherein each of said shelf members has a tab at opposite ends thereof movable between positions substantially parallel or normal to the associated shelf member.

8. A container for supporting a plurality of similar items comprising a pair of spaced apart, parallel frame members; a plurality of shelf members joined to and spanning the space between said frame members, each of said shelf members having at least one free edge and said shelf members being spaced apart a distance sufficient to accommodate one of said items between each adjacent pair of shelf members; and a retainer flap hinged to the free edge of each shelf member which overlies an adjacent shelf member and normally bearing against the adjacent shelf member inwardly of its free edge and forming a barrier to the space between the shelf member to which said retainer flap is hinged and the adjacent shelf member, said retainer flap being swingable to a position in which it confronts and engages the shelf member to which it is hinged, thereby providing access to the space between the latter shelf member and the adjacent shelf member.

9. A container according to claim 8 wherein each of said shelf members is hinged to said frame members.

10. A container according to claim 8 wherein each of said retainer flaps is concave.

* * * * *